US006061395A

United States Patent [19]
Tonami

[11] Patent Number: 6,061,395
[45] Date of Patent: May 9, 2000

[54] WAVEFORM EQUALIZER

[75] Inventor: Junichiro Tonami, Kanagawa-ken, Japan

[73] Assignee: Victor Company of Japan, Ltd., Yokohama, Japan

[21] Appl. No.: 08/960,145

[22] Filed: Oct. 29, 1997

[30] Foreign Application Priority Data

Oct. 31, 1996 [JP] Japan .................................... 8-307411

[51] Int. Cl.[7] ....................................................... H03H 7/30

[52] U.S. Cl. .......................... 375/232; 375/229; 375/230; 375/348

[58] Field of Search .................................... 375/232, 230, 375/233, 254, 348, 350

[56] References Cited

U.S. PATENT DOCUMENTS

| | | | |
|---|---|---|---|
| 5,400,189 | 3/1995 | Sato et al. | 360/65 |
| 5,414,571 | 5/1995 | Matsushige et al. | 360/65 |
| 5,615,233 | 3/1997 | Baum et al. | 375/350 |
| 5,923,707 | 7/1999 | Tanaka et al. | 375/232 |

FOREIGN PATENT DOCUMENTS

| | | |
|---|---|---|
| 5-102793 | 4/1993 | Japan . |
| 05291879 | 11/1993 | Japan . |
| 5-291879 | 11/1993 | Japan . |
| 6-303099 | 10/1994 | Japan . |

OTHER PUBLICATIONS

P.H. Siegel and J.K. Wolf: "Modulation and coding for Information Storage" IEEE Communications Magazine, vol. 29 No. 12, Dec. 1991, New York, pp. 68–86, XP000287983* p. 76, col. 1, line 29—p. 79, col. 1, line 8–; figures 17, 19–22,33*.

S.U.H. Oureshi: "Adaptive Equalization" Proceedings of the IEEE, vol. 73,–No. 9, Sep. 1985, pp. 1349–1387, XP000608510* p. 1349, col. 1, line 1—p. 1387, column 2, last line*.

*Primary Examiner*—Stephen Chin
*Assistant Examiner*—Mohammad Ghayour
*Attorney, Agent, or Firm*—Eugene Lieberstein; Michael N. Meller

[57] ABSTRACT

A waveform equalizer prevents the delay of coefficient convergence due to the characteristics of a reproduced signal or the coefficient divergence due to an increase in determined errors. The waveform equalizer constituted by a transversal filter suppresses inter-symbol interferences of a transmitted digital information signal by multiplying the digital information signal and delayed signals thereof by tab coefficients and adding the multiplication results. The waveform equalizer comprises a virtual determination circuit for virtually determining the most plausible digital information from the output of the transversal filter, an error calculation circuit for providing an amplitude error based on the virtual determination result, a retaining and selecting circuit for retaining and selecting the digital information signal and the delayed output thereof, and an updating circuit for multiplying the output from the error calculation circuit by the outputs from the retaining and selecting circuit and to thereby update tab coefficients, wherein the virtual determination circuit virtually determines the value of a most plausible digital information signal by detecting a peak and utilizing the correlationship between signal components of the digital information signal.

13 Claims, 9 Drawing Sheets

WAVEFORM EQUALIZER

FIELD OF THE INVENTION

The present invention relates to a waveform equalizer suitable for use in an apparatus for recording and reproducing a digital information signal; and, more particularly, to a waveform equalizer capable of preventing convergence delay of tab (tap) coefficients due to the characteristics of a reproduced signal and coefficient divergence due to an increase in determination errors.

BACKGROUND OF THE INVENTION

A conventional transversal filter used as a waveform equalizer automatically controls tab coefficients of delay elements having an inter-tab (tap) delay identical to a signal period. The filter is basically stable in view of the fact that it is of a non-cyclic type.

In a magnetic recording and reproducing apparatus for recording and reproducing a digital information signal through the use of a partial response method, there can be also used a waveform equalizer comprised of the transversal filter. In such a filter, the reproduced digital information signal is adaptively adjusted according to the difference between an output of the filter and an estimated value thereof in order to suppress the inter-symbol interferences of the reproduced digital information signal, the estimated value being obtained by mapping the output to one of predetermined ternary values. The outputs of the filter are then subject to a symbol decoder, e.g., Viterbi decoder, and an error correction device, e.g., RS (Reed Solomon) decoder.

In a reproducing circuit of the aforementioned magnetic recording and reproducing apparatus, as shown in FIG. 7, a reproduced signal, obtained by scanning a tape-shaped recording medium T (to be referred to as a "tape" hereinafter) with an aid of a magnetic head H installed on a rotary drum (not shown), is amplified to a predetermined level by a pre-amplifier (PA) 1 and noise components thereof are removed by a filter 2. The filtered signal is then converted into a digital signal by an analog-to-digital (A/D) converter 3. At a DC controller 4, a direct current (DC) level is set for the digital signal and the level adjusted digital signal is supplied as a reproduced digital information signal to a waveform equalizer E.

The waveform equalizer E includes delay circuits 11–14 for sequentially delaying and outputting the reproduced digital information signal fed to the waveform equalizer E; multipliers 15–19 for multiplying the reproduced digital information signals and the outputs of the delay circuits 11–14 by the outputs of lowpass filters (LPF's) 36–40 to be described later; an adder 20 for adding the outputs of the multipliers together 15–19 and outputting the result as an equalized output signal; a determination circuit F for virtually determining a value of the digital information signal by comparing the output of the adder 20 with predetermined thresholds; an error calculation circuit G for outputting an amplitude error of the equalized output signal with respect to its expectation by calculating the difference between the output of the virtual determining circuit F and the equalized output signal of the adder 20; multipliers 31–35 for multiplying the amplitude error by the reproduced digital information signal and the outputs of the delay circuits 11–14; and the LPF's 36–40 for lowpass filtering the outputs of the multipliers 31–35.

In multiplying the reproduced digital information signal and the outputs of the delay circuits 11–14 by the amplitude error of the error calculation circuit G, there occurs a delay in the amplitude error since the amplitude error is generated by the operation of the virtual determination circuit F and the error calculation circuit G. Therefore, a delay (not shown) is employed on the signal paths from the DC controller 4 and the delay circuits 11–14 to the multipliers 31–35, thereby synchronizing the multiplication timing of the multipliers, i.e., the amplitude error, and the multiplicands, i.e., the outputs of the DC controller 4 and the delay circuits 11–14.

In this connection, delay elements may be installed for the respective outputs of the DC controller 4 and the delay circuits 11–14 or the output of the delay 14 may be sequentially delayed to be supplied to the multipliers 31–35.

The reproduced digital information signal supplied from the DC controller 4 is sequentially delayed by a predetermined amount by each of the delay circuits 11–14 and then the reproduced digital information signal and the outputs of delay circuits 11–14 are multiplied by the outputs of the LPF's 36–40 at the multipliers 15–19, thereby obtaining outputs from the multipliers 15–19 weighted by tab coefficients. The multiplication results from the multipliers 15–19 are then added together at the adder 20 to be shaped for easy discrimination among signal waveforms having various values in order to obtain binary digital information data therefor. In other words, in case an original digital information signal waveform are resuppressed by inter-symbol interferences, the inter-symbol interference components of the corrupted waveform are suppressed by the waveform equalization carried out by adding weighted multiplication results obtained based on the tab coefficients from the LPF's 36–40.

The output of the adder 20 is supplied to the virtual determination circuit F and the error calculation circuit G. The virtual determination circuit F determines an expectation value of the output from the adder 20, by comparing the output with predetermined signal levels, the expectation value being one of, e.g., ternary values of −1, 0, 1. The determination result is provided to the error calculation circuit G, which calculates the amplitude difference or error between the output of the adder 20 and the expectation value, and provides same to the multipliers 31–35.

The multipliers 31–35 multiply the original signal, i.e., the reproduced digital information signal, and the delayed signals thereof (the timing is adjusted by the delay elements, as described above.) by the amplitude error, respectively. By performing the multiplication of the equalization error, i.e., the amplitude error of the equalized output signal, by the non-equalized input signals at the multipliers 31–35, there are obtained the tab coefficients to be used in equalizing the reproduced digital information signal. The waveform equalization of the reproduced digital information signal is accomplished by suppressing the inter-symbol interferences therein by multiplying the reproduced digital information signal and the delayed signals thereof by the tab coefficients.

As waveform equalizers for use in, e.g., a magnetic reproducing apparatus for reproducing a video signal recorded on a magnetic recording medium by using the partial response method and converting a video signal into a digital signal, there have been proposed a magnetic reproducing apparatus (disclosed in Japanese Laid-Open Publication No. 5-102793) having a filter for performing a simplified equalization on a reproduced signal depending on the characteristics of a pre-equalizer, thereby not requiring initial values for the respective tab coefficients of a digital filter acting as an adaptive equalizer and being capable of obtaining quick operation stability; and an automatic equalizing circuit (disclosed in Japanese Laid-Open Publication No. 5-291879) for automatically adjusting tab coefficients of an equalizer used for demodulation in digital data communicating or recording apparatus according to the distortion of an input signal and capable of being implemented by an analog circuit.

In the waveform equalizer described above, however, the determined value of the reproduced signal may result in an error value and then eventually diverge if initial values of the tab coefficients of the filter are not appropriate or inter-symbol interference becomes severe due to a deteriorated frequency characteristic of the input signal.

For instance, when a digital information signal shown in FIG. 8A is inputted to the waveform equalizer, the digital information signal is equalized to the one shown in FIG. 8B.

In FIG. 8C, sampling values of the information signal before waveform equalization are indicated in a negative direction and those of the information signal after waveform equalization are indicated in a positive direction. The sampling values correspond to either +1 or −1. It can be seen that positions of the sampling values before equalization do not completely coincide with those after equalization. In other words, unmatched sampling values are those erroneously recognized as +1's and −1's due to the divergence of the determined values. As a consequence, the eye pattern of the information signal obtained as shown in FIG. 8C converges into an erroneous value, as shown in FIGS. 9A and 9B, wherein FIG. 9A shows an eye pattern of an unequalized reproduced digital information signal and FIG. 9B illustrates an eye pattern of an equalized information signal whose determined value converges to the error value.

Conventionally, most of the transversal filters are formed by analog circuits, each including therein a plurality of delay circuits typically having time delays different from each other. In such a case, it becomes necessary to adjust the response of the individual equalizer or in some cases, an additional adjustable equalizer needs to be installed in front of the filter, resulting in bulky circuits and complicated adjustment thereof.

In the case of equalizing a signal having a transmission rates of several tens of MHZ, since sampling gates in the unit of several nano seconds (n sec) are generated for sampling signal waveforms, it is necessary to precisely adjust the positions of the generated gates, which is a troublesome task.

In a transmission system adopting a Viterbi decoder for recording and reproducing a digital information signal by the partial response method, there has been proposed by the inventor of the instant invention a waveform equalizer employing the transversal filter for sampling and removing a waveform error generated due to a distortion in a transmission channel by a bit clock used in Viterbi decoding, which does not, however, disclose any method of the solving the aforementioned problems (see Japanese Laid-Open Publication No. 6-303099).

A better equalization result can be obtained by improving the performance of the equalizer itself. Besides that, it might also be contemplated for the better equalization result to carry out the determination of a reproduced signal according to the results determined by using a circuit dedicated for performing the Viterbi decoding; however, the Viterbi decoding of the unequalized input signal does not guarantee a correct result either. In other words, since delay control is performed by the determination result of the Viterbi decoding after waveform-equalizing the reproduced signal, some information may be erased. Thus, it cannot be assured that the determination of the reproduced signal before equalization has been effectively performed.

Also, in the Viterbi decoder, it is necessary to maintain the determination results until the most plausible value is determined by a peak detection and, therefore, a relatively large memory is required. Thus, the system becomes costly and the configuration and the control thereof become complicated.

To be more specific, in the transmission path using the 2-bit digital delay correlationship in the waveform equalization of a digital information signal of a partial-response class-4 type, two memories are respectively used to perform discrimination of information signal values by an 1-bit interval, which can reduce the cost in connection with memory access works. However, according to this method, it may be difficult to determine appropriate digital values for the signal before equalization.

Also, in a Viterbi decoding and determination circuit, a faint input signal may not be waveform-equalized since threshold levels for virtually determining the digital information signal are set to be identical to those for determining final digital values.

The magnetic reproducing system (Japanese Patent Laid-Open Publication No. 5-102793) or the automatic equalizer (Japanese Patent Laid-open Publication No. 5-291879) supra does not offer any solution for such problems described above.

SUMMARY OF THE INVENTION

It is, therefore, an object of the invention to provide apparatus capable of solving such problems.

In accordance with a first aspect of the present invention, there is provided a waveform equalizer adopting a transversal filter for suppressing inter-symbol interferences of a transmitted digital information signal by summing weighted values obtained by multiplying the transmitted digital information signal and delayed signals thereof by tab coefficients, each of the tab coefficients being adaptively controlled, the waveform equalizer comprising: a virtual determination circuit for virtually determining a plausible digital information signal from an output of the transversal filter; an error calculation circuit for outputting an amplitude error calculated based on the virtual determination result; a retaining and selecting circuit for retaining and selecting the transmitted digital information signal and the delayed signals thereof; and an updating circuit for multiplying the amplitude error outputted from the error calculation circuit by the output signals from the retaining the selecting circuit to thereby update the tab coefficients of the transversal filter in accordance with the multiplication result, wherein the virtual determination circuit virtually determines the value of the plausible digital information signal by peak detection based on correlations between signal components of the transmitted digital information signal and the error calculation circuit obtains the amplitude error in accordance with the virtual determination result.

In accordance with a second aspect of the present invention, there is provided the wave form equalizer, wherein the virtual determination circuit of the first aspect of the invention adaptively determines threshold values for virtually determining the plausible digital information signal in response to a level of the transmitted digital information signal or a frequency characteristic thereof.

In accordance with a third aspect of the present invention, there is provided the waveform equalizer according to one of the first and the second aspects of the invention, wherein the transmitted digital information signal is the one transmitted by a partial response method using the inter-symbol interferences.

In accordance with a fourth aspect of the present invention, there is provided the waveform equalizer according to one of the first to the third aspects of the invention, wherein the transmitted digital information signal is a reproduced digital information signal generated by an information signal recording/reproducing apparatus for recording and reproducing a digital information signal.

In accordance with a fifth aspect of the present invention, there is provided a waveform equalizer according to one of the first to the third aspects of the invention, wherein the transmitted digital information signal is a reproduced digital information signal generated by an information signal reproducing apparatus for reproducing a digital information signal from a recording medium on which the digital information signal is recorded.

In accordance with a sixth aspect of the present invention, there is provided a waveform equalizer according one of the first to the third aspects of the invention, wherein the transmitted digital information signal is a digital information signal received by an information signal receiving apparatus or an information signal transmitting/receiving apparatus for receiving and reproducing the digital information signal transmitted by a band transmission.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
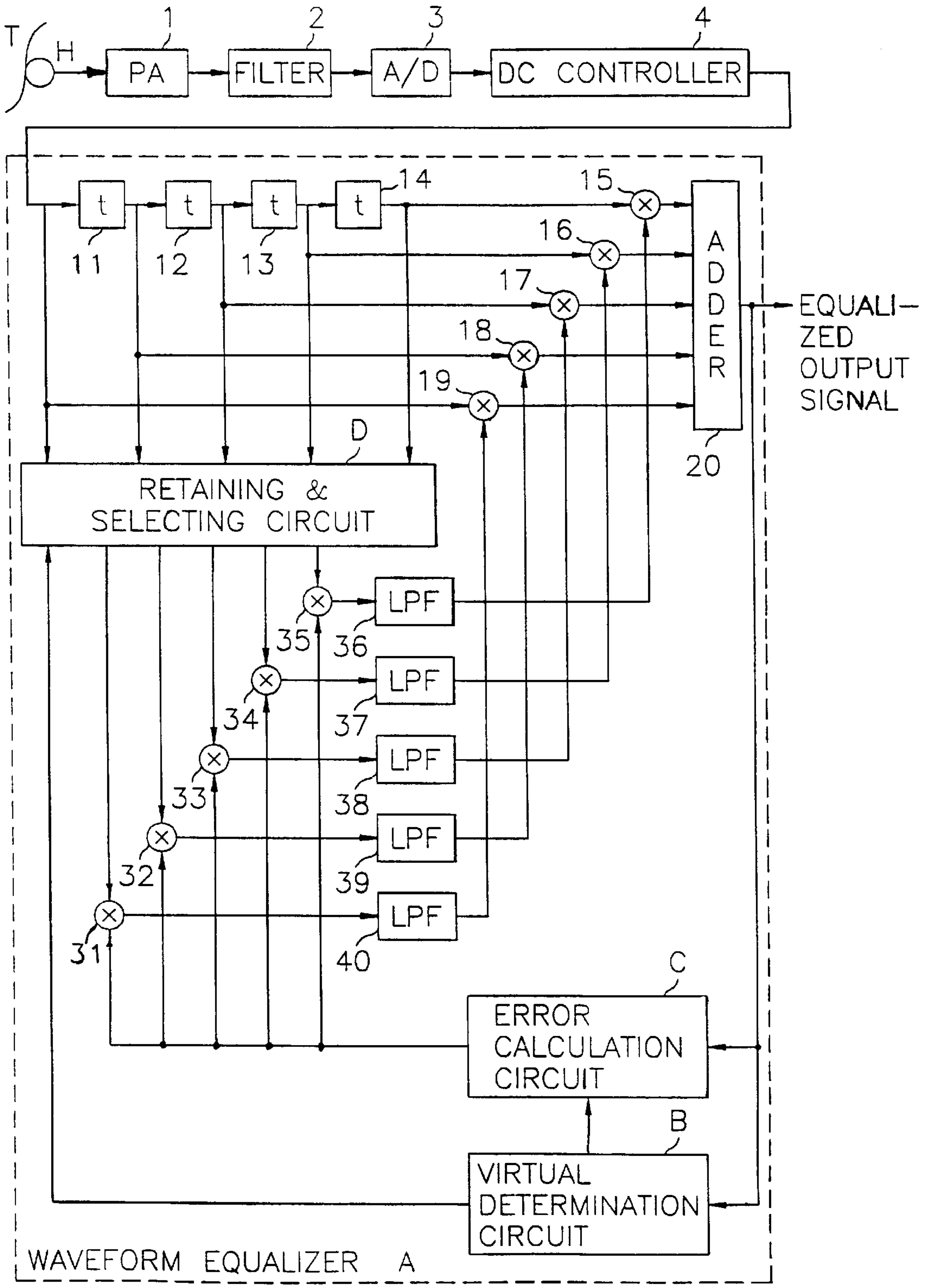
FIG. 1 is a block diagram of a waveform equalizer in accordance with the present invention.

Hereinbelow, a preferred embodiment of the present invention will be described with reference to the accompanying drawings. The same reference numerals are used for designating the same parts as those described above, and the explanation thereof will be omitted.

The waveform equalizer according to the present invention performs waveform equalization by determining a plausible value of a digital information signal by using a peak detection algorithm of the Viterbi decoding. As shown in FIG. 1, a reproduced signal obtained, e.g., by a magnetic head H scanning a tape-shaped recording medium T is supplied to a waveform equalizer A through a pre-amplifier (PA) 1, a filter 2, an A/D converter 3 and a DC controller 4.

The waveform equalizer A of the present invention includes delay circuits 11 to 14 for sequentially delaying the reproduced digital information signals supplied to the waveform equalizer A by a predetermined amount; a retaining and selecting circuit D for retaining and selecting the reproduced digital information signal and the delayed outputs of the respective delay circuits 11 to 14; multipliers 15 to 19 for multiplying the outputs of the delay circuits 14–11 and the reproduced digital information signal by the outputs of lowpass filter's (LPF's) 36–40, respectively; an adder 20 for adding the outputs of adders 15–19 together; a virtual determination circuit B for virtually determining a digital signal value based on the output of the adder 20; an error calculation circuit C for outputting an amplitude error between the output of the adder 20 and an expectation value thereof calculated based on determination result from the virtual determination circuit B; multipliers 31–35 for multiplying the amplitude error from the error calculation circuit C by the signal values selected by the retaining and selecting circuit D; and the LPFs 36–40 for integrating the outputs of the multipliers 31–35, thereby outputting the lowpass filtered components thereof to the multipliers 15 to 19.

Figure 7:
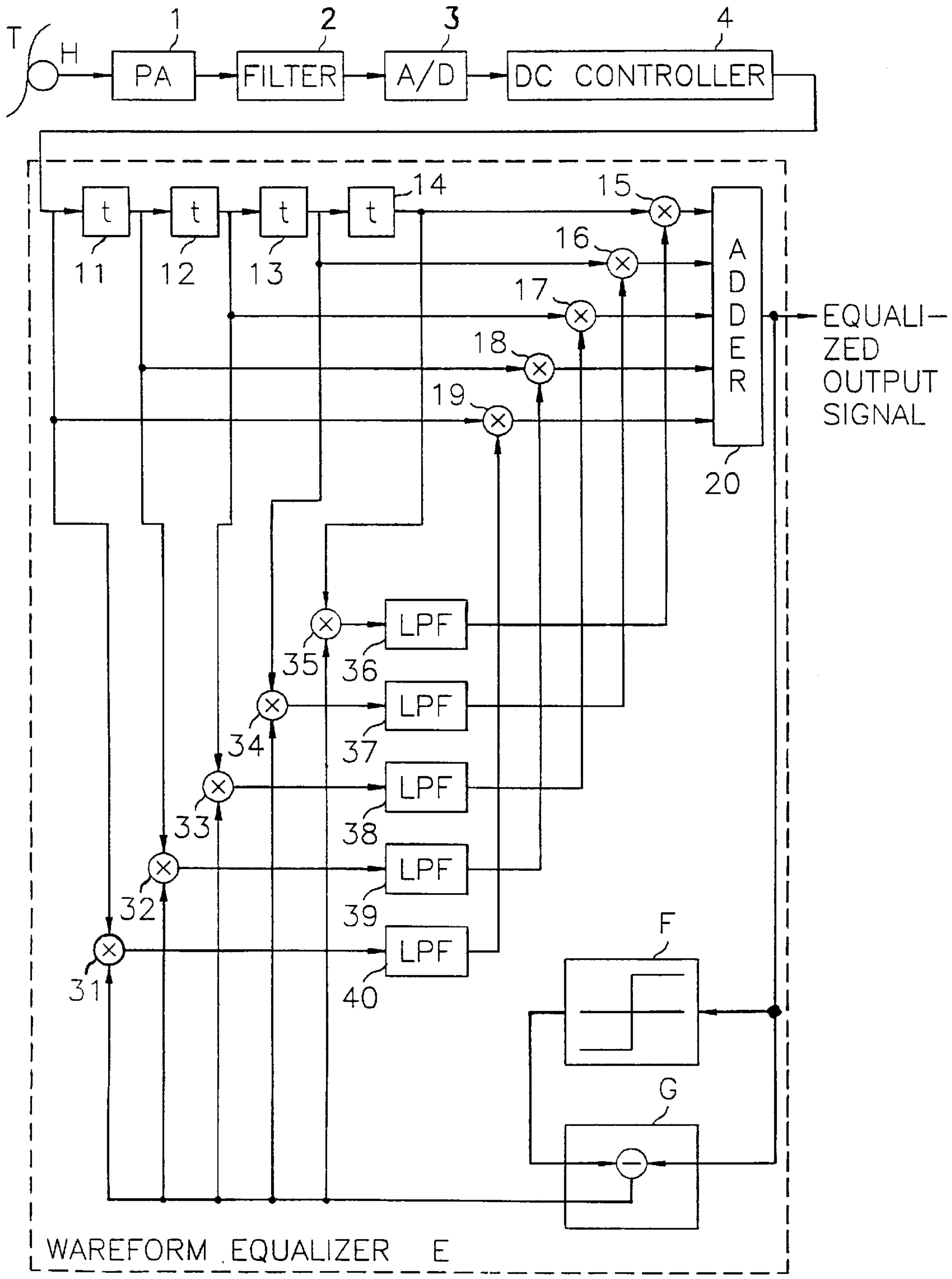
FIG. 7 offers a block diagram of a conventional waveform equalizer.

In contrast to the conventional transversal filter or the waveform equalizer E shown in FIG. 7, the waveform equalizer A of the present invention includes the virtual determination circuit B and the error calculation circuit C, which are improved versions of their counterpart conventional circuits F and G, and is further provided with the retaining and selection circuit D. Also, as in the conventional transversal filter, there are provided in the waveform equalizer A delay elements (not shown), for compensating for the processing delay of the amplitude error, between the retaining and selecting circuit D and the inputs thereto.

The equalized output signal from the adder 20 is provided to the virtual determination circuit B and the error calculation circuit C and to a transmitter (not shown) for the transmission thereof to a digital signal processor and the like. The digital signal processor determines a binary value of the digital equalized output signal from the transversal filter; performs reproducing operations such as error correction and deshuffling etc. on the determined digital signal; and then reconstructs the video and audio information contained in the reproduced digital information signal.

Figure 2:
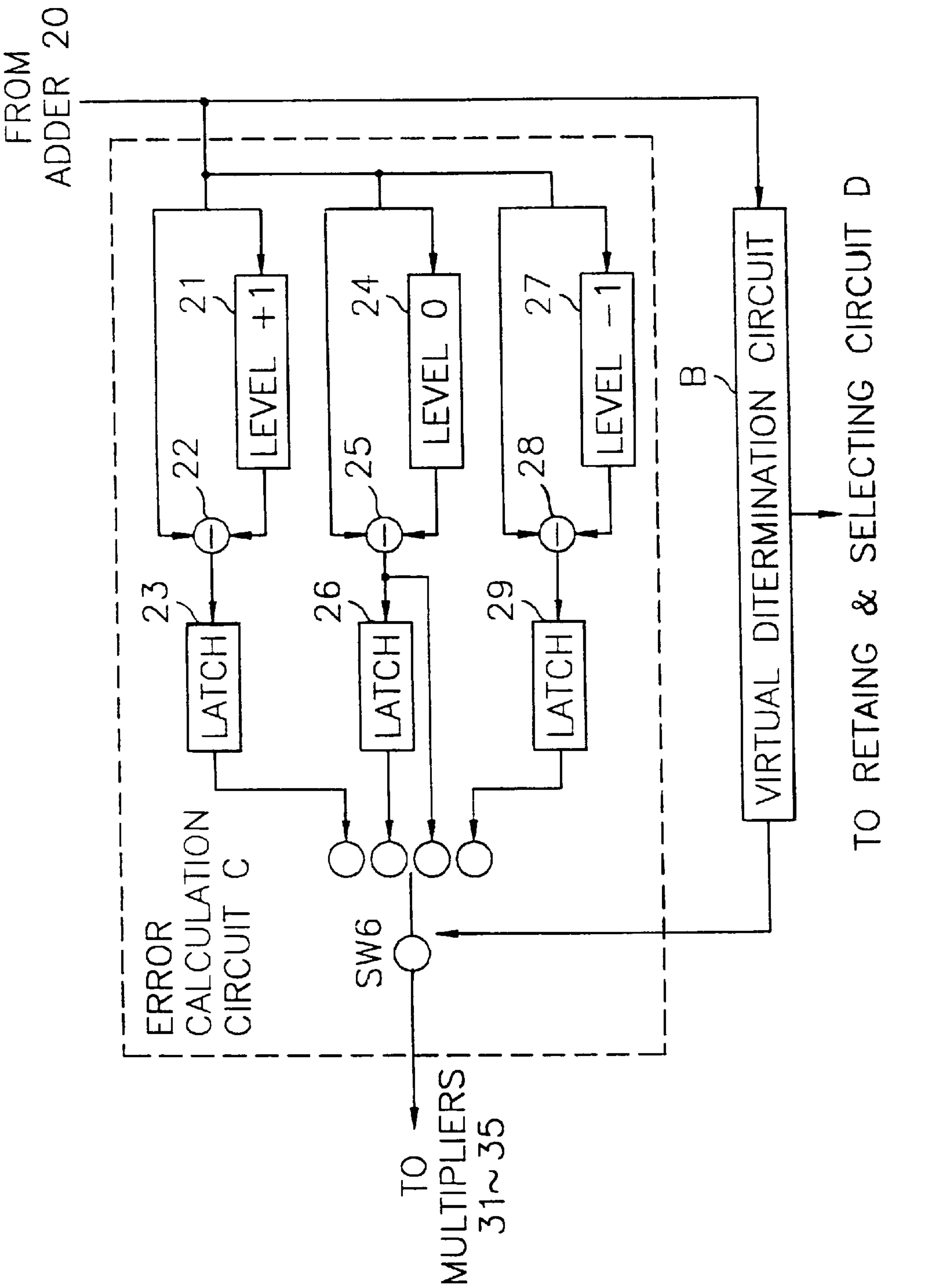
FIG. 2 is a block diagram of a virtual determination circuit and an error calculation circuit included in the waveform equalizer shown in FIG. 1.

Referring to FIG. 2, there are illustrated the virtual determination circuit B and the error calculation circuit C, which includes three, i.e., +1, 0 and −1, level determination circuits 21, 24 and 27 and corresponding number of subtractors 22, 25 and 28 and latches 23, 26 and 29. The virtual determination circuit B compares the equalized output signal from the adder 20 with threshold values decided by the previous sampling values to thereby virtually determine a value of the equalized output signal as one of +1, 0 and −1. In response to the virtual determination result, a switch SW6 is controlled to select one of the outputs of the latches 23, 26 and 29 and the output of the subtractor 25.

Figures 8A, 8B, 8C:
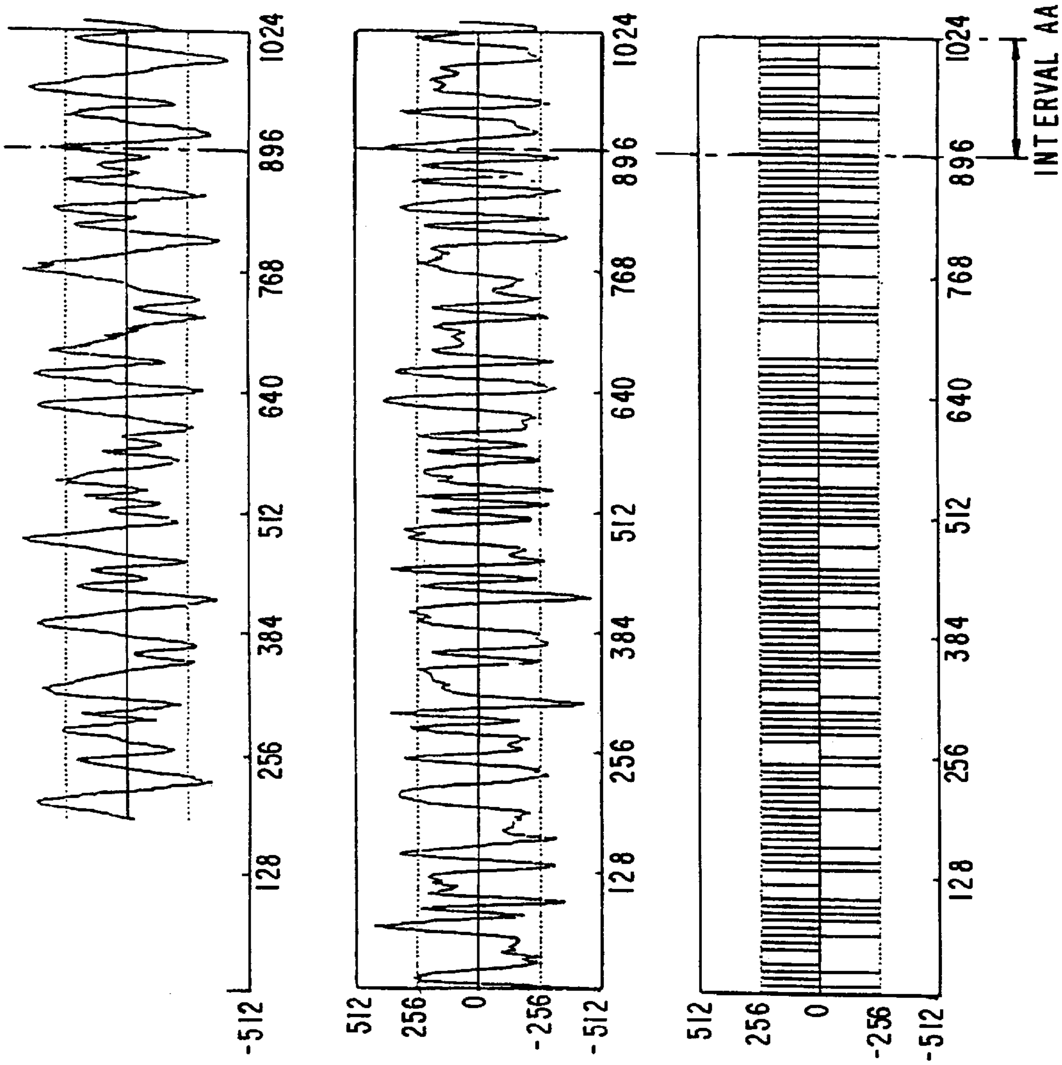
FIGS. 8A to 8C present waveform diagrams for explaining an algorithm employed in the conventional waveform equalizer.
Figures 9A, 9B:
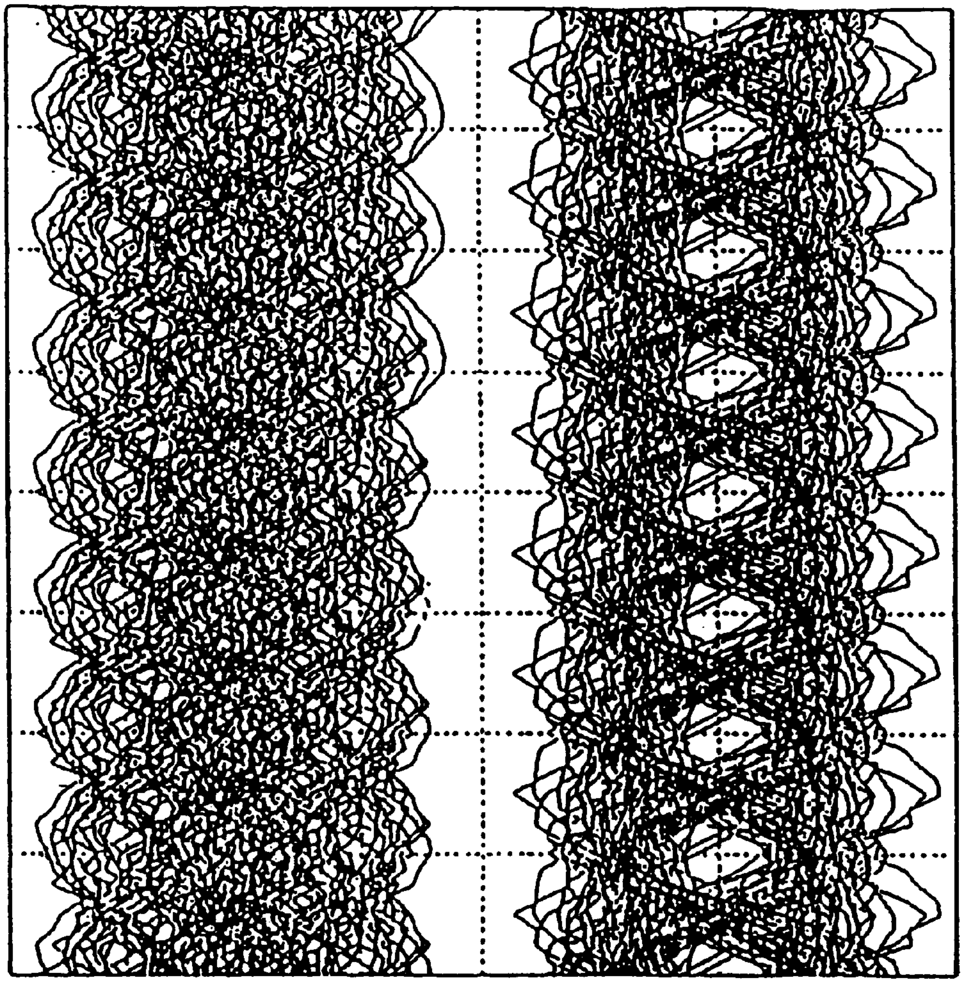
FIGS. 9A and 9B are eye patterns of a reproduced digital information signals obtained by the conventional waveform equalizer.

The operation of the virtual determination circuit B will now be described with reference to an interval AA of the reproduced signal shown in FIG. 8A. For the convenience, sake, the interval AA is schematically enlarged in FIGS. 4A to 4D. Assuming that digital signals to be reproduced in the interval AA are . . . 1 1 0 0 0 1 0 0 1 1 1 1 0 0 0 1 . . . as shown in FIG. 4A, information signals of . . . 1 0 (−1) 0 0

Figures 4A, 4B, 4C, 4D:
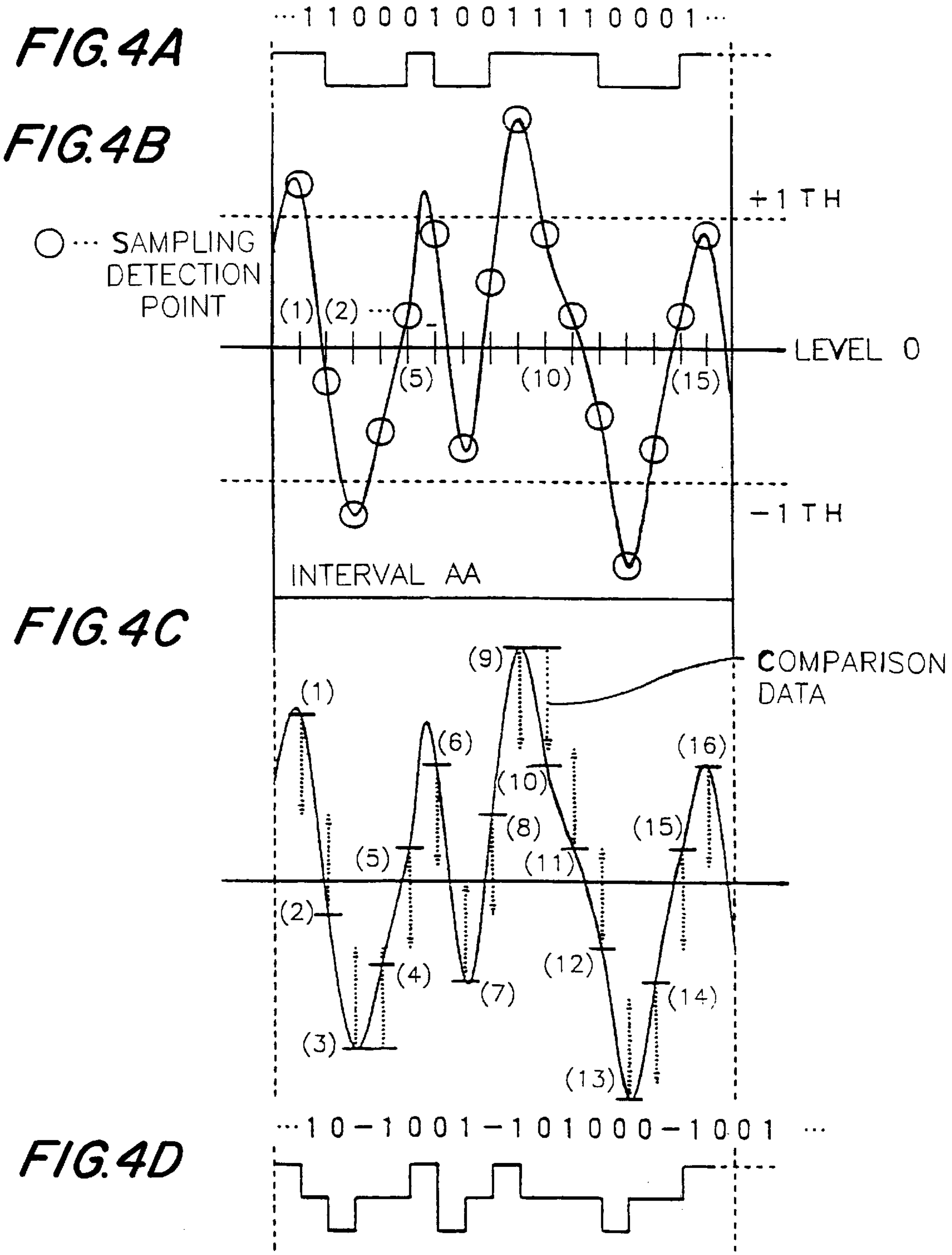
FIGS. 4A to 4D illustrate the operation of the virtual determination circuit.

1 (−1) 0 1 0 0 0 (−1) 0 0 1 . . . are then obtained as shown in FIG. 4D since the magnetic recording and reproducing system and the transversal filter have the transfer characteristic of 1−D (one bit delay and subtraction operator). (−1) is a signal affected by inter-symbol interferences.

The transfer function of encoding the digital information signal by the partial response method is $1/1\text{-}D^2$, which can be divided into 1/(1−D)(1+D) wherein (1−D) corresponds to a differential characteristic during reproduction. In other words, the reproduced signal is processed with (1−D) function, thereby obtaining . . . 1 0 (−1) 0 0 1 (−1) 0 1 0 0 0 (−1) 0 0 1 . . . Although not explained herein, the waveform equalized information signal is processed with 1+D (one bit delay and addition) and decoded.

As shown in FIG. 4B, if the reproduced signal is sampled for every predetermined timing (1) to (16) and a previous sampling result at the timing (1) is determined as −1, a comparison data of a certain level (dotted arrow) is set for the timing (1) as shown in FIG. 4C, wherein the comparison data is set in a direction as indicated by the dotted arrow to detect the next +1 from the virtually determined value −1.

Next, at the timing (2), since the detected level at the timing (2) exceeds the comparison data at the timing (1), the direction of the comparison data at the timing (2) is changed positively (+) and the sampling value at the timing (1) is decided as +1. At this time, a candidate value at the timing (2) is 0 or −1.

At the timing (3), since the detected level is closer to −1 than the value at the timing (2) is, the value at the timing (2) is decided as 0. At the timing (4), since the detected level is closer to 0 than the level at the timing (3) is, and does not exceed the comparison data at the timing (3), the value at the timing (4) is decided as 0, while the value at the timing (3) is not decided at this moment.

At the timing (5), since the detected level exceeds the comparison data at the timing (3), the sampling value of the timing (3) is decided as −1.

In other words, since the value of +1 or −1 has a sharp waveform and the waveform around a peak tends to exceed the preset comparable data, if a next sampling value does not exceed a comparable data for a certain sampling value but is close to 0, the data is decided as 0. However, the previous data is not decided at that moment.

For example, at the point of the timing (4), the sampling value at the timing (4) is decided as 0, while the data at the timing (3) is undecided until the level at the timing (5) is detected. If the detected level at the timing (5) is lower than that at the timing (3), the value of the timing (3) is decided as 0 and if the detected level at the timing (5) is greater than that at the timing (4) as shown in FIG. 4C, the value at the timing (3) is decided as −1. The levels at the remaining timings (6) to (16) are determined in a similar manner described above.

As described above, the virtual determining circuit B detects the most plausible value of +1 or −1. In other words, if the values +1's or −1's are decided, the other values are considered as 0's. In accordance with the present invention, therefore, even though a noise due to inter-symbol interferences is added to an originally zero valued level sampled around the peak of the sharp waveform, the level can be determined as 0 without being erroneously determined as +1 or −1 by the conventional thresholds.

Referring back to FIG. 2, the ideal signal levels 1, 0 and −1 of digital information signals to be reproduced are set at the level determination circuits 21, 24 and 27 and supplied to the substractors 22, 25 and 28, respectively. The substractors 22, 25 and 28 substracts ideal signal levels provided from the level determination circuits 21, 24 and 27 from the equalized output signal to thereby supply differences to the latches 23, 26 and 29 as the values of the error levels, respectively. The latches 23, 26 and 29 perform latching operation in response to the sampling timings of the virtual determination circuit B and supply the outputted error levels to the switch SW6.

For instance, as shown in FIGS. 4A to 4D, if the sampling value of the virtual determination circuit B is set as an undecided value of 0 or +1 at the timing (1), the differences, i.e., amplitude errors, between the detected signal level and ideal signal levels (corresponding to 0 and 1 in this case) are supplied by the subtractors 22 and 25 to the latches 23 and 26 and maintained therein, respectively. Since the detected value at the timing (2) exceeds the comparison data at the timing (1), the sampling value at the timing (1) is decided as +1; and, subsequently, the virtual determination circuit B controls the switch SW6 so that the amplitude error from the latching circuit 23 is supplied to the multipliers 31 to 35 shown in FIG. 1.

If the detected value at the timing (2) does not exceed the comparison data at the timing (1) but is closer to 0, the value at the timing (2) is decided as 0 with the value at the timing (1) being undecided so that the switch SW6 switches the output of the subtractor 25. Also, if the detected value at the timing (2) does not exceed the comparison data at the timing (1) but is closer to +1, the value at the timing (1) is decided as 0 so that the switch SW6 switches the output of the latching circuit 26. Similarly, if the value at the timing (1) is decided as −1, the switch SW6 switches the output of the latching circuit 29.

Even though the preferred embodiment of the invention has been described with reference to three level determination circuits 21, 24 and 29 as shown in FIG. 2, the features and functions of the error calculation circuit C can be equally achieved by two sets of latches, subtractors and level determination circuits by removing either the set of the latch 23, subtractor 22 and the level determination circuit 21 or the set of those 29, 28 and 27. In such an instance, the remaining level determination circuit 21 or 27 carries out +1 and −1 level determination processes.

For example, the remaining level determining circuit 21 or 27 sets a threshold level of +1 and determines the level of the input signal from the adder 27 when the previous value is determined as +1. Also, when the previous value is determined as −1, the remaining level determining circuit 21 or 27 sets a threshold level of −1 and then determines the level of the input signal from the adder 20 accordingly.

Ternary information signals, e.g., . . . 1 0 −1 0 0 1 −1 0 1 0 0 0 −1 0 0 1 . . . , obtained by the waveform equalization process described above are transmitted to a 1+D delay circuit and a determination circuit (not shown) and are converted back therein into binary digital information signals, e.g., . . . 1 1 0 0 0 1 0 0 1 1 1 1 0 0 0 1 . . .

Since a digital information signal, specifically a digital signal recorded by the partial response method, is recorded by adopting inter-symbol interferences, peaks of a same polarity or sign are not detected in a row. For example, the digital information signal of . . . 0 0 1 0 0 . . . is detected as . . . 0 0 1 −1 0 . . . , illustrating inter-symbol interferences having a value of −1 occured immediately after an isolated pulse of +1. Therefore, if two +1 levels are detected at certain neighboring sampling points, either one of the detected +1 levels is supposed to be a noise or an erroneous value since two +1 levels cannot occur continuously without intervening a 0 or −1 level therebetween.

Identification of the noise or the plausible value among the continuous +1 levels is carried out by using a peak detection algorithm. The algorithm is a detection method for obtaining a plausible value and is based on the fact that the plausible value is related to signal components but is not related to noise components. For example, if a +1 level of an amplitude is detected at a certain sampling point and another +1 level of a greater amplitude is detected at its next sampling point, the plausible value of the +1 level corresponds to the one at the next sampling point. However, if the detected at the next sampling point seems to be the −1 level, in lieu of the +1 level of the greater amplitude, the +1 level at the certain sampling point is determined as the plausible one.

However, if a +1 level, a −1 level of a certain amplitude and another −1 level of smaller amplitude are detected continuously, the −1 level of the certain amplitude is considered to be a noise and determined as 0, accordingly.

The reproduced digital information signal fed from the DC controller 4 and the delayed signals thereof from the delay circuits 11–14 are supplied to the retaining and selecting circuit D as shown is FIG. 1.

Figure 3:
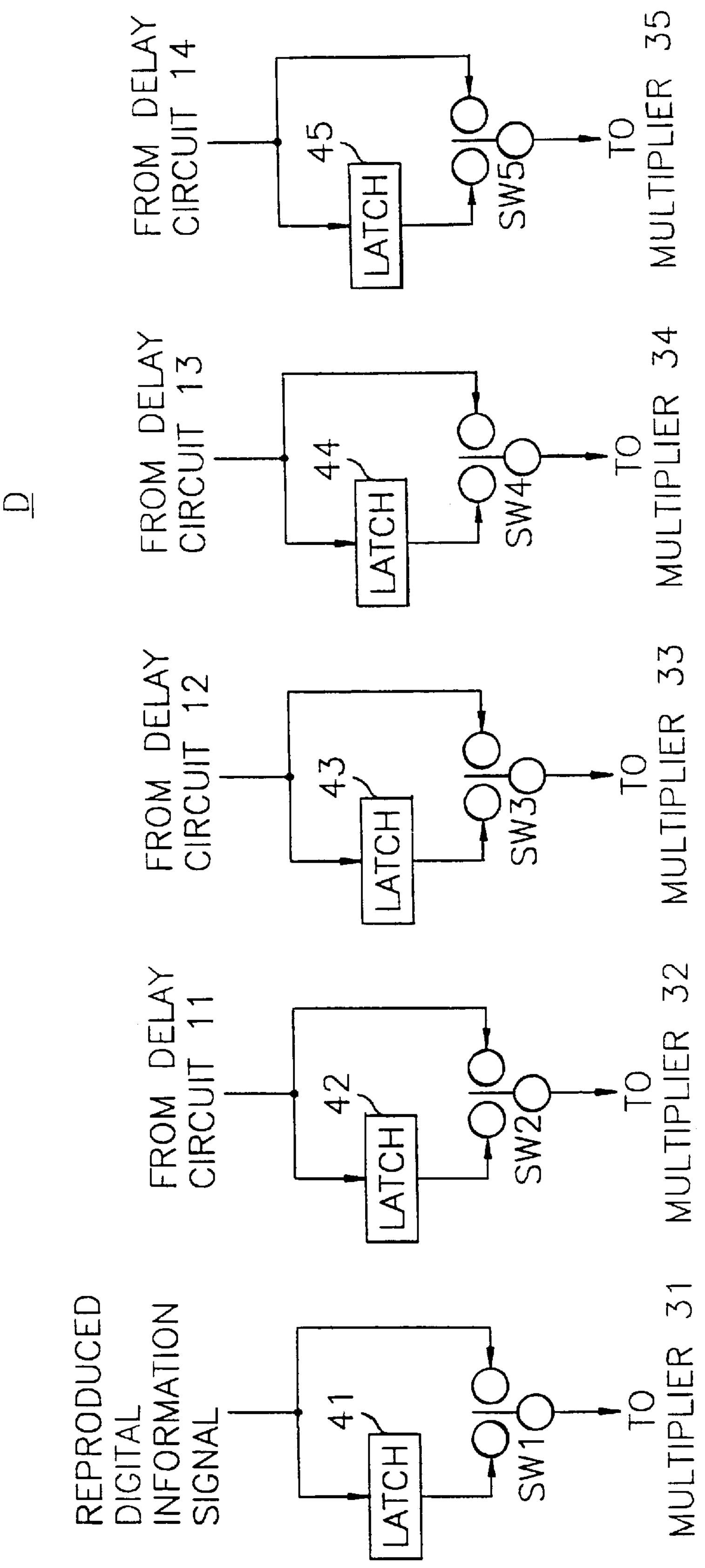
FIG. 3 shows a block diagram of a retaining and selecting circuit in the waveform equalizer shown in FIG. 1.

Referring to FIG. 3, there is illustrated a detailed block diagram of the retaining and selecting circuit D, which includes a plurality of latches and switches. The reproduced signal and the delayed signals from the delays circuits 11–14 are supplied to the switches SW1–SW5 and the latches 41–45, respectively. The latches 41–45 and the switches SW1–SW5 are controlled by the virtual determination circuit B. If the switch SW6 shown in FIG. 2 selects an output from one of the latches 23, 26 and 29, the switches SW1 through SW5 select respective outputs of the latches 41–45. Otherwise, i.e., if the switch SW6 selects the output of the subtractor 25, the switches SW1–SW5 select the respective outputs from the DC controller 4 and the delay circuits 11–14 shown in FIG. 1.

When the switch SW6 selects an output from one of the latches 23, 26 and 29, the latches 41–45 output previously latched signals; and newly latch and update therein the reproduced digital information signal and the outputs of the delay circuits 11–14.

Referring back to FIG. 1, the reproduced signal and the output signals of the delay circuits 11–14 are supplied to the retaining and selecting circuit D through delay elements (not shown) to compensate for the delay of the amplitude error as described hereinbefore.

The output from the switch SW6 of the error calculation circuit C is provided to the multipliers 31–35; and, at the same time, the outputs of the switches SW1–SW5 are fed to the multipliers 31–35, respectively. The respective multipliers 31–35 multiply the outputs from the switches SW1–SW5 by the amplitude error from the error calculation circuit C and supply the multiplication results to the LPFs 40–36, respectively. The LPFs 40–36 integrate the multiplication results, to thereby feed back low-frequency components thereof to the multipliers 15–19, respectively.

At the multiplies 19–15, the outputs from the DC controller and the delay circuits 11–14 are multiplied by the outputs from the LPFs 40–36, respectively, to thereby provide tab coefficient updated signals, which in turn enables the equalized output signal from the adder 20 to be equalized into a most plausible waveform.

As described above, at the waveform equalizer A of the present invention, the value of the reproduced digital information signal is determined by the virtual determination circuit B and subsequently the amount of error of the determined value is detected with respect to a predetermined level at the error calculation circuit C. The detection result is multiplied by the output values of the retaining and selecting circuit D to discriminate the plausible digital information signal value from the noise, thereby performing the waveform equalization on the reproduced digital information signal.

The output timing of the amplitude error may be varied according to input signals. However, since the integration is performed by the LPFs 36–40 for a sufficiently long time, there could be no problem even though data determination is not carried out within a clock period. Also, even if it may not be possible to determine all data correctly during an initial convergence stage, the coefficients of the waveform equalization can converge to a correct value or the divergence of data may be prevented by repeating proper determinations statistically.

Figure 5A:
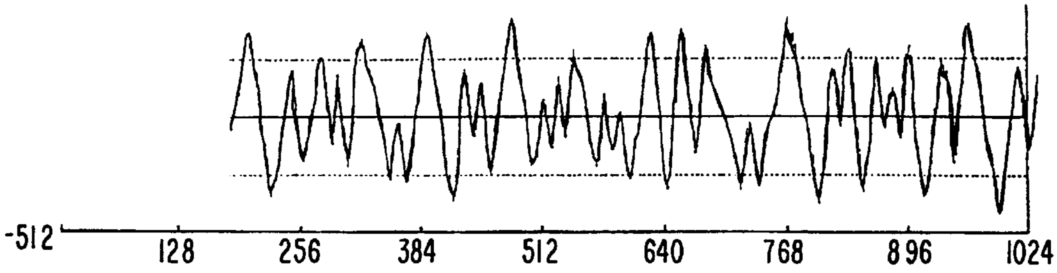
FIGS. 5A to 5C depict waveform diagrams of a digital information signal reproduced by the waveform equalizer of the present invention.
Figure 5B:
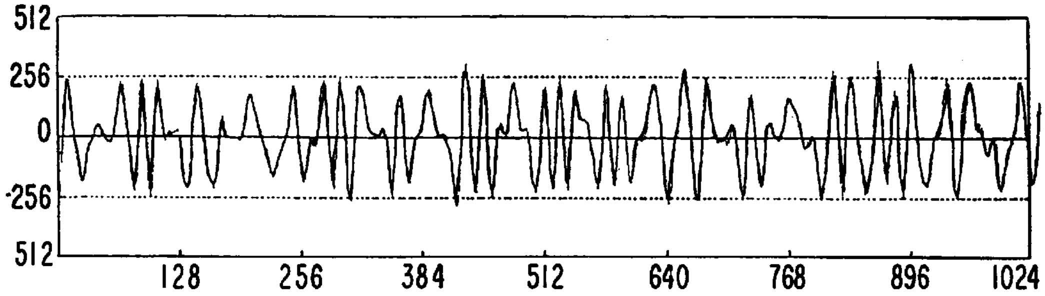
Figure 5C:
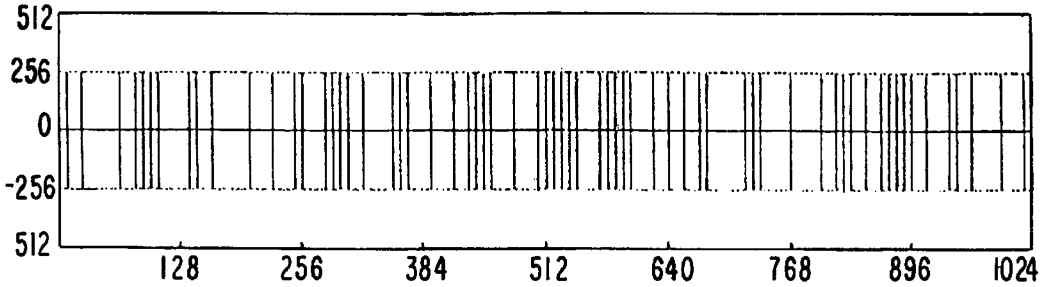

When the waveform of the reproduced digital information signal as shown in FIG. 5A is inputted to the waveform equalizer of the present invention, the reproduced digital information signal is determined as shown in FIG. 5C. It can be seen from the exact coincidence of the occurrences of the determined values of +1 and those of the values −1 that the original values +1, −1 and 0 are precisely determined, respectively.

Figures 6A, 6B:
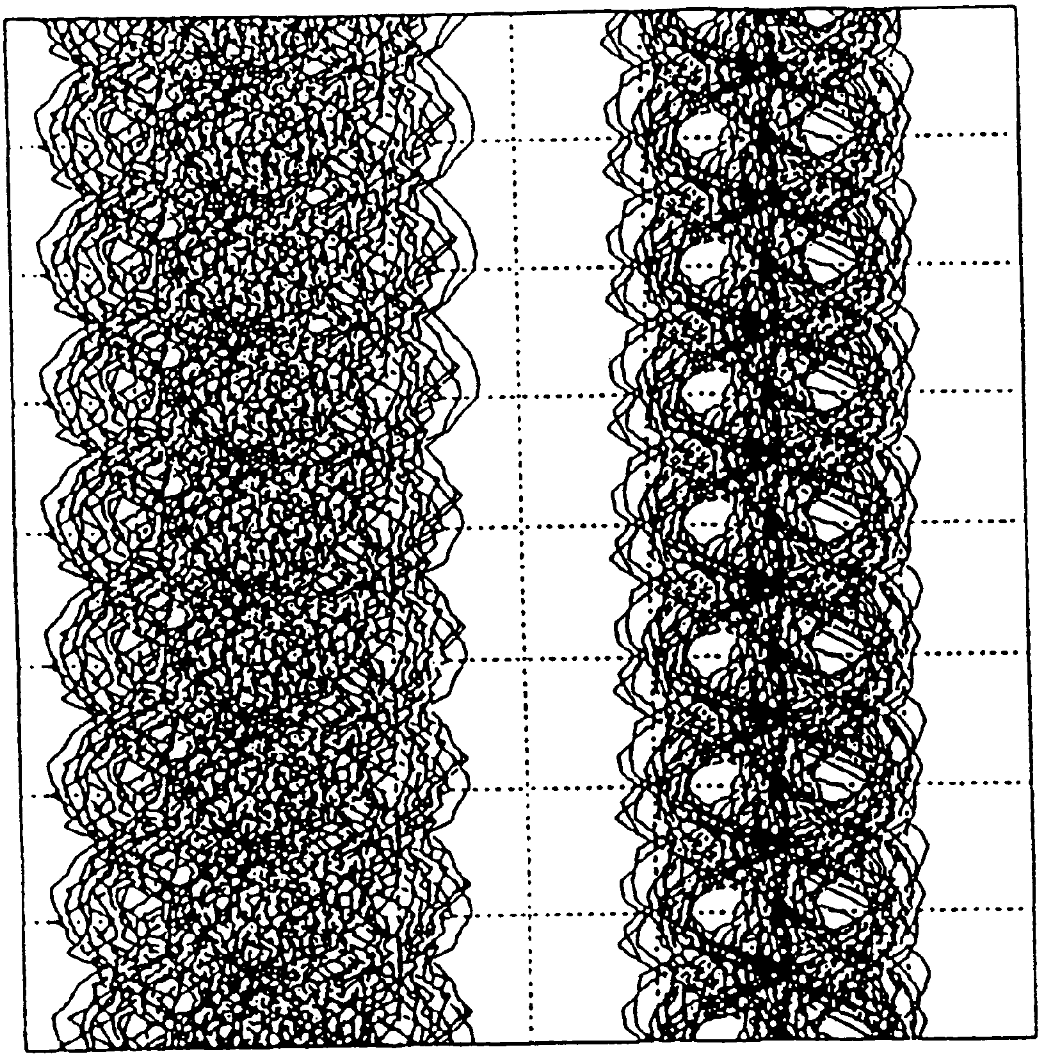
FIGS. 6A and 6B provide eye patterns of the reproduced digital information signals obtained by the waveform equalizer of the present invention.

As shown in FIGS. 6A and 6B illustrating the eye patterns of the reproduced digital information signal before and after waveform equalization as described above, the values of +1, 0 and −1 are distinctly separated from one another and converge to respective plausible values.

As described above, by determining the plausible reproduced digital information signal for the digital information signal reproduced from a recording and reproducing apparatus such as a digital video tape recorder (DVTR) in a manner described above, the convergence of waveform equalization can be expedited and the convergence range can be extended. Also, since most parts of the waveform equalizer of the prevention can be implemented by digital circuits, stable operation can be secured without suffering from the deviation in the characteristics of the equalizer.

In the preferred embodiment of the invention described above, the comparison data of the virtual determination circuit B and the signal levels of the error calculation circuit C are respectively determined according to predetermined threshold values and a ternary information signal is derived from the reproduced signal accordingly. It should be noted, however, that the threshold values may be adaptively determined in accordance with the levels or the frequency characteristics of the signals supplied to the waveform equalizer of the present invention. For instance, the threshold values may be set adaptively to second order differential values of the signals inputted to the waveform equalizer of the present invention or the frequency characteristics of the signal to be waveform-equalized by the tab coefficients.

Also, more precise waveform equalization may be accomplished by employing a pre-filter having an adjustment equalizer together with the waveform equalizer of the present invention. In this case, the tab coefficients of the pre-filter may be automatically decided by using those of the waveform equalizer of the present invention.

Even though the present invention has been described with respect to the waveform equalizer which performs waveform equalization on a reproduced signal in a recording and reproducing apparatus for recording and reproducing a digital information signal such as a DVTR, it should be apparent to those skilled in the art that the waveform equalizer of the present invention can be applied to any signal transceiver such as a recording and reproducing apparatus of a digital disc, a communication modem or a ghost canceler as long as the transceiver employs therein a transmission channel for a digital information signal.

Further, by using the waveform equalizer of the present invention along with the Viterbi decoder described above, a more plausible reproduced digital information signal can be obtained.

Also, a waveform equalizer using a transversal filter may employ a zero-forcing algorithm. Such waveform equalizer does not operate its output with an input signal as in the waveform equalizer of the present invention employing a minimum square error algorithm, but instead controls the tab coefficients of the input signal based on the output signal only. Therefore, by applying the inventive features of the waveform equalizer to the one utilizing the zero-forcing algorithm, there can be devised an equalizer of a simplified circuit configuration capable of performing waveform equalization by adopting binary logic operations, without having to operate the input and output signal.

For instance, a more simplified waveform equalizer may be implemented by adopting the virtual determining circuit B to the zero-forcing waveform equalizer.

Since, however, the zero-forcing waveform equalizer has specified convergence conditions which have to be satisfied and controls tab coefficients by its output signal only, the value of the signal having a great jitter, such as a digital information signal reproduced from the DVTR, may diverge. The applications of the zero-forcing waveform equalizer can be found in such communication system as a digital information signal transceiver.

In addition, since the conventional circuit configuration including, e.g., the multipliers for updating tab coefficients based on the error level of the reproduced digital information signal can be adopted for signal operations in the transversal filter, the operation control of the overall waveform equalizer of the present invention does not become complicated compared with the conventional one.

Also, even though not specifically described, the transversal filter described in the embodiment of the present invention is of a negative feedback loop; and, therefore, it should be noted that the transversal filter of the invention includes inverting circuits (not shown) such as an inverter for inverting the output of the error calculation circuit C.

In accordance with the present invention, the transversal filter includes the virtual determination circuit for virtually determining the reproduced digital information signal, error calculation circuit for outputting the amplitude error based on the virtual determination result, the retaining and selecting circuit for retaining and selecting the reproduced digital information signal and the delayed signals thereof, and the updating means for multiplying the amplitude error output from the error calculation circuit by the outputs from the retaining and selecting circuit and to thereby update tab coefficients of the transversal filter based on the multiplication result. Therefore, the reproduced digital information signal does not converge to an erroneous value but instead, the plausible information signal can be obtained.

Further, in accordance with the present invention, since the overall waveform equalizer can be constructed by digital circuits, it does not become necessary to adjust the responses of plural analog equalizers having characteristics different from each other and the positions of sampling gates. Also, a separate equalizer for adjusting delay time is not necessarily installed in the front of the filter. Thus, a simplified circuit configuration can be realized. In addition, the circuit can be scaled down by manufacturing same through the use of integrated circuit technology and no adjustment is required during a manufacturing process.

Additionally, in accordance with the present invention, the waveform equalizer is constructed by digital circuits, thereby allowing a signal processing to be carried out at a rate identical to the sampling rate of the reproduced digital information signal.

While the invention has been shown and described with respect to the preferred embodiments, it will be understood by those skilled in the art that various changes and modifications may be made without departing from the scope of the invention as defined in the following claims.

What is claimed is:

1. A waveform equalizer adopting a transversal filter for suppressing inter-symbol interferences of a transmitted digital information signal by summing weighted values obtained by multiplying the transmitted digital information signal and delayed signals thereof by tab coefficients, each of the tab coefficients being adaptively controlled, the waveform equalizer comprising:

a virtual determination means for virtually determining a plausible digital information signal from an output of the transversal filter;

an error calculation means for outputting an amplitude error calculated based on the virtual determination result;

a retaining and selecting means for retaining and selecting the transmitted digital information signal and the delayed signals thereof; and an updating means for multiplying the amplitude error outputted from the error calculation means by the output signals from the retaining the selecting circuit to thereby update the tab coefficients of the transversal filter in accordance with the multiplication result, wherein the virtual determination means virtually determines a value of the plausible digital information signal by peak detection based on correlations between signal components of the transmitted digital information signal and the error calculation means obtains the amplitude error in accordance with the virtual determination result.

2. The waveform equalizer of claim 1, wherein the virtual determination means adaptively determines threshold values for virtually determining the plausible digital information signal in response to a level of the transmitted digital information signal or a frequency characteristic thereof.

3. The waveform equalizer of claim 1, wherein the transmitted digital information signal is the one transmitted by a partial response method using the inter-symbol interferences.

4. The waveform equalizer of claim 2, wherein the transmitted digital information signal is the one transmitted by a partial response method using the inter-symbol interferences.

5. The waveform equalizer of claim 1, wherein the transmitted digital information signal is a reproduced digital information signal generated by an information signal recording/reproducing apparatus for recording and reproducing a digital information signal.

6. The waveform equalizer of claim 2, wherein the transmitted digital information signal is a reproduced digital information signal generated by an information signal recording/reproducing apparatus for recording and reproducing a digital information signal.

7. The waveform equalizer of claim 3, wherein the transmitted digital information signal is a reproduced digital information signal generated by an information signal recording/reproducing apparatus for recording and reproducing a digital information signal.

8. The waveform equalizer of claim 1, wherein the transmitted digital information signal is a reproduced digital information signal generated by an information signal reproducing apparatus for reproducing a digital information signal from a recording medium on which the digital information signal is recorded.

9. The waveform equalizer of claim 2, wherein the transmitted digital information signal is a reproduced digital information signal generated by an information signal reproducing apparatus for reproducing a digital information signal from a recording medium on which the digital information signal is recorded.

10. The waveform equalizer of claim 3, wherein the transmitted digital information signal is a reproduced digital information signal generated by an information signal reproducing apparatus for reproducing a digital information signal from a recording medium on which the digital information signal is recorded.

11. The waveform equalizer of claim 1, wherein the transmitted digital information signal is a digital information signal received by an information signal receiving apparatus or an information signal transmitting/receiving apparatus for receiving and reproducing the digital information signal transmitted by a band transmission.

12. The waveform equalizer of claim 2, wherein the transmitted digital information signal is a digital information signal received by an information signal receiving apparatus or an information signal transmitting/receiving apparatus for receiving and reproducing the digital information signal transmitted by a band transmission.

13. The waveform equalizer of claim 3, wherein the transmitted digital information signal is a digital information signal received by an information signal receiving apparatus or an information signal transmitting/receiving apparatus for receiving and reproducing the digital information signal transmitted by a band transmission.

* * * * *